Patented Aug. 26, 1941

2,253,669

UNITED STATES PATENT OFFICE 2,253,669

ESTRADIOL HIGHER FATTY ACID ESTER

Rezsö Weisz, Budapest, Hungary, assignor to Chinoin Gyogyszer, És Vegyészeti Termékek Gyára R. T. (Dr. Kereszty & Dr. Wolf), Ujpest, Hungary, a corporation of Hungary No Drawing. Application February 17, 1939, Serial No. 256,856. In Hungary January 28, 1939

4 Claims. (Cl. 260—397.5)

In my copending application Ser. No. 190,952, of February 17, 1938, I described estradiol derivatives acylated in the aliphatic hydroxyl (position 17) of the estradiol, by acylating estradiol etherified in the phenolic hydroxyl (position 3) by a benzyl group or substituted benzyl group substituated in the benzene nucleus, whereby an estradiol derivative is obtained which contains in position 3 a benzyl group or a substituted benzyl group substituated in the benzene nucleus, and in position 17 an acyl group. By reducing agents, especially by catalytic reducing agents, the benzyl group, or the benzyl group substituated in the benzene nucleus can be split off from this compound, whereby an estradiol derivative is obtained containing only in position 17 the introduced acyl group. These 17-acyl-estradiol products have very advantageous therapeutical properties. Those of the compounds whose aliphatic group contain a low number of carbon atoms are easily soluble in oils and easily resorbed by the organism, so that they can be used advantageously to provoke sudden great hormonic action.

Such a quick and intensive action is however not always requested; it is often necessary to ensure a relatively weak but steady hormonic action. Studying the speed of absorption of different estradiol-17-acyl derivatives I have found that estradiol-17-acyl derivatives containing in the acyl group more than 12, especially 15-18 carbon atoms, and especially estradiol derivatives containing a fatty acid radical bound to the oxygen atom in position 17 are easily soluble in oils, but are slowly absorbed by the organism so that they are well adapted to keep the hormonic level of the organism constant and even.

Accordingly these compounds can be used advantageously in the therapy of castrated or climacteric women. In such cases one oily injection of e. g. 17-stearyl-estradiol ensures for a long time the necessary longevity of the hormon action.

These hormonic derivatives—e. g. the 17-mono-stearyl-estradiol possessing very favourable properties as to its absorption—may be used to advantage in therapeutics with cases where a prolonged and constant hormonic effect is asked for, e. g. in the treatment of ovari-ectomized and climacteric women. With these cases, a hormonic depot can be formed in the system by injecting an oily solution of the 17-stearyl-estradiol, thus accomplishing by a single injection the required constant hormonic effect. Applying e. g. 30 mgrs. of the above-mentioned compound, dissolved in 1 cc. of oil in a single injection to ovariectomized women, the uterus mucosa attains the fully developed stage of proliferation within the physiologic two weeks' time.

The new compounds can be produced practically in the same manner as shown in my above mentioned copending application.

Example 2 grams of 3-benzyl-estradiol are dissolved in 12 ccs. of pyridine, then 3.5 ccs. of stearyl-chloride are added and the mixture is heated to and kept on 60° C. for 4 hours after which the mixture is poured into 150 ccs. of 10 per cent. sulphuric acid and extracted by ethyl ether. The separated ether solution is washed with diluted sodium carbonate solution and water until neutrality. By evaporating the ether the 3-benzyl-17-stearyl-estradiol is obtained. This product is dissolved in 100 ccs. of glacial acetic acid and the solution is reduced at room temperature with hydrogen in the presence of a palladium catalysator, after which the solution is separated from the catalysator by filtration and evaporated in vacuo. The residue can be crystallized from ethyl alcohol. In this manner about 1.42 grams of 17-stearyl-estradiol of M. P. 84° C. are obtained.

What I claim is:

1. As a new product of manufacture, an estradiol derivative of the following general formula:

in which X is a member of the group consisting of H and benzyl, and is bound to the oxygen atom in position 3; and R is an alkyl radical containing 14 to 17 carbon atoms, the group —CO.R being bound to the oxygen atom in position 17.

2. As a new product of manufacture, an estradiol derivative of the formula $C_{18}H_{23}O_2.CO.R$ in which R is an alkyl radical containing 14-17 carbon atoms and the group —CO—R is bound to the oxygen atom in position 17.

3. As a new product of manufacture, the 17-mono-stearate of estradiol having a melting point of 84° C.

4. As a new product of manufacture, the 17-mono-stearate of estradiol-3-benzyl-ether.

REZSÖ WEISZ.